United States Patent
Shapiro

(10) Patent No.: US 10,422,244 B2
(45) Date of Patent: Sep. 24, 2019

(54) SYSTEM FOR COOLING A TURBINE SHROUD

(71) Applicant: General Electric Company, Schenectady, NY (US)

(72) Inventor: Jason David Shapiro, Metheun, MA (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 14/658,313

(22) Filed: Mar. 16, 2015

(65) Prior Publication Data

US 2016/0273382 A1 Sep. 22, 2016

(51) Int. Cl.
| | | |
|---|---|---|
| *F01D 25/12* | (2006.01) | |
| *F01D 11/08* | (2006.01) | |
| *F01D 11/12* | (2006.01) | |
| *F01D 11/24* | (2006.01) | |
| *F01D 9/04* | (2006.01) | |

(52) U.S. Cl.
CPC ............... *F01D 25/12* (2013.01); *F01D 9/04* (2013.01); *F01D 11/08* (2013.01); *F01D 11/12* (2013.01); *F01D 11/24* (2013.01); *F05D 2220/32* (2013.01); *F05D 2230/64* (2013.01); *F05D 2240/11* (2013.01); *F05D 2260/20* (2013.01); *F05D 2260/201* (2013.01);
(Continued)

(58) Field of Classification Search
CPC ... F01D 5/12; F01D 9/04; F01D 11/08; F05D 2300/64
USPC .................................................. 415/176, 178
See application file for complete search history.

(56) References Cited

U.S. PATENT DOCUMENTS

| 3,362,681 A | 1/1968 | Smuland |
| 3,864,056 A | 2/1975 | Gabriel et al. |
(Continued)

FOREIGN PATENT DOCUMENTS

| CN | 101315033 A | 12/2008 |
| CN | 101737103 A | 6/2010 |
(Continued)

OTHER PUBLICATIONS

European Search Report and Opinion issued in connection with corresponding EP Application No. 16160170.3 dated Aug. 26, 2016.
(Continued)

*Primary Examiner* — Kenneth Bomberg
*Assistant Examiner* — Michael L Sehn
(74) *Attorney, Agent, or Firm* — Dority & Manning, P.A.

(57) ABSTRACT

In one aspect the present subject matter is directed to a system for cooling a turbine shroud. The system includes a cooling medium source that provides a cooling medium, and a turbine shroud support assembly that includes a shroud support ring. A shroud seal is coupled to the turbine shroud support assembly. The shroud seal includes a back side surface and an inner surface. A pin extends at least partially through the shroud support ring towards the back side surface. The pin includes a flow passage having an inlet that is in fluid communication with the cooling medium source and an aperture that is disposed downstream from the inlet. The aperture is oriented to direct a flow of the cooling medium out of the flow passage in a flow direction that is non-perpendicular to the back side surface of the shroud seal.

16 Claims, 4 Drawing Sheets

(52) U.S. Cl.
CPC ..... *F05D 2300/6033* (2013.01); *Y02T 50/672* (2013.01); *Y02T 50/676* (2013.01)

(56) References Cited

U.S. PATENT DOCUMENTS

| | | | |
|---|---|---|---|
| 4,329,113 | A | 5/1982 | Ayache et al. |
| 4,756,053 | A | 7/1988 | Madden et al. |
| 6,726,448 | B2 | 4/2004 | McGrath et al. |
| 6,769,865 | B2 | 8/2004 | Kress et al. |
| 7,011,493 | B2 * | 3/2006 | Marchi .................... F01D 9/04 415/116 |
| 7,044,709 | B2 * | 5/2006 | Bruce ...................... F01D 9/04 415/135 |
| 7,520,715 | B2 * | 4/2009 | Durocher ................. F01D 9/04 415/116 |
| 8,079,807 | B2 | 12/2011 | Shapiro et al. |
| 2004/0109763 | A1 | 6/2004 | Ciacci et al. |
| 2012/0247124 | A1 | 10/2012 | Shapiro et al. |
| 2013/0078418 | A1 | 3/2013 | Bunker et al. |
| 2013/0156550 | A1 | 6/2013 | Franks et al. |
| 2013/0156556 | A1 | 6/2013 | Franks et al. |
| 2013/0164140 | A1 | 6/2013 | Shah et al. |
| 2014/0182264 | A1 | 7/2014 | Weisberger et al. |
| 2014/0202168 | A1 | 7/2014 | Shapiro et al. |

FOREIGN PATENT DOCUMENTS

| | | |
|---|---|---|
| FR | 2438165 A1 | 4/1980 |
| WO | 20150023321 A2 | 2/2015 |

OTHER PUBLICATIONS

Machine Translation and First Office Action and Search issued in connection with corresponding CN Application No. 201610148639.3 dated Dec. 21, 2018.

\* cited by examiner

SYSTEM FOR COOLING A TURBINE SHROUD

FIELD OF THE INVENTION

The present subject matter relates generally to a turbine shroud for a gas turbine engine. More particularly, the present subject matter relates to a system for cooling the turbine shroud.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components. As a result, it is generally necessary to cool the various rotatable and stationary turbine components to meet thermal and/or mechanical performance requirements.

Typically, a cooling medium such as compressed air is routed from the compressor section through various cooling passages or circuits defined within or around the various rotatable and stationary turbine components, thus providing cooling to those components. One generally effective cooling technique involves directing or focusing a jet or stream of the cooling medium directly onto a surface of a corresponding rotatable or stationary turbine component, thus providing jet or impingement cooling to that component. However, in certain instances, jet or impingement cooling may inadvertently occur, thus resulting in undesirable thermal stresses through the material of the particular rotatable or stationary turbine component due to a large temperature differential between the cooling medium and the combustion gases. This may negatively impact the thermal/mechanical life of the particular rotatable or stationary turbine component, particularly where the component is formed from a composite or ceramic matrix composite CMC-type material such as in various components of the turbine shroud assembly.

Accordingly, a turbine cooling system that reduces thermal stresses in the various turbine hardware components, particularly a turbine shroud assembly, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cooling a turbine shroud. The system includes a cooling medium source that provides a cooling medium, and a turbine shroud support assembly that includes a shroud support ring. A shroud seal is coupled to the turbine shroud support assembly. The shroud seal includes a backside surface that is radially spaced from an inner side surface. A pin extends at least partially through the shroud support ring and the shroud seal towards the backs side surface. The pin includes a flow passage having an inlet that is in fluid communication with the cooling medium source and an aperture that is disposed downstream from the inlet. The aperture is oriented to direct a flow of the cooling medium out of the flow passage in a flow direction that is non-perpendicular to the back side surface of the shroud seal.

Another aspect of the present subject matter is directed to a system for cooling a turbine shroud. The system includes a cooling medium source that provides a cooling medium, a shroud support ring, and a shroud seal that is coupled to the shroud support ring. The shroud seal includes a back side surface that is radially spaced from an inner side surface. The system further includes a pin that extends at least partially through the shroud support ring and the shroud seal towards the back side surface. The pin includes a flow passage. The flow passage includes an inlet that is in fluid communication with the cooling medium source and a plurality of apertures disposed downstream from the inlet. The plurality of apertures includes a first aperture that is oriented to direct at least a portion of a flow of the cooling medium out of the flow passage in a flow direction that is non-perpendicular to the back side surface of the shroud seal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
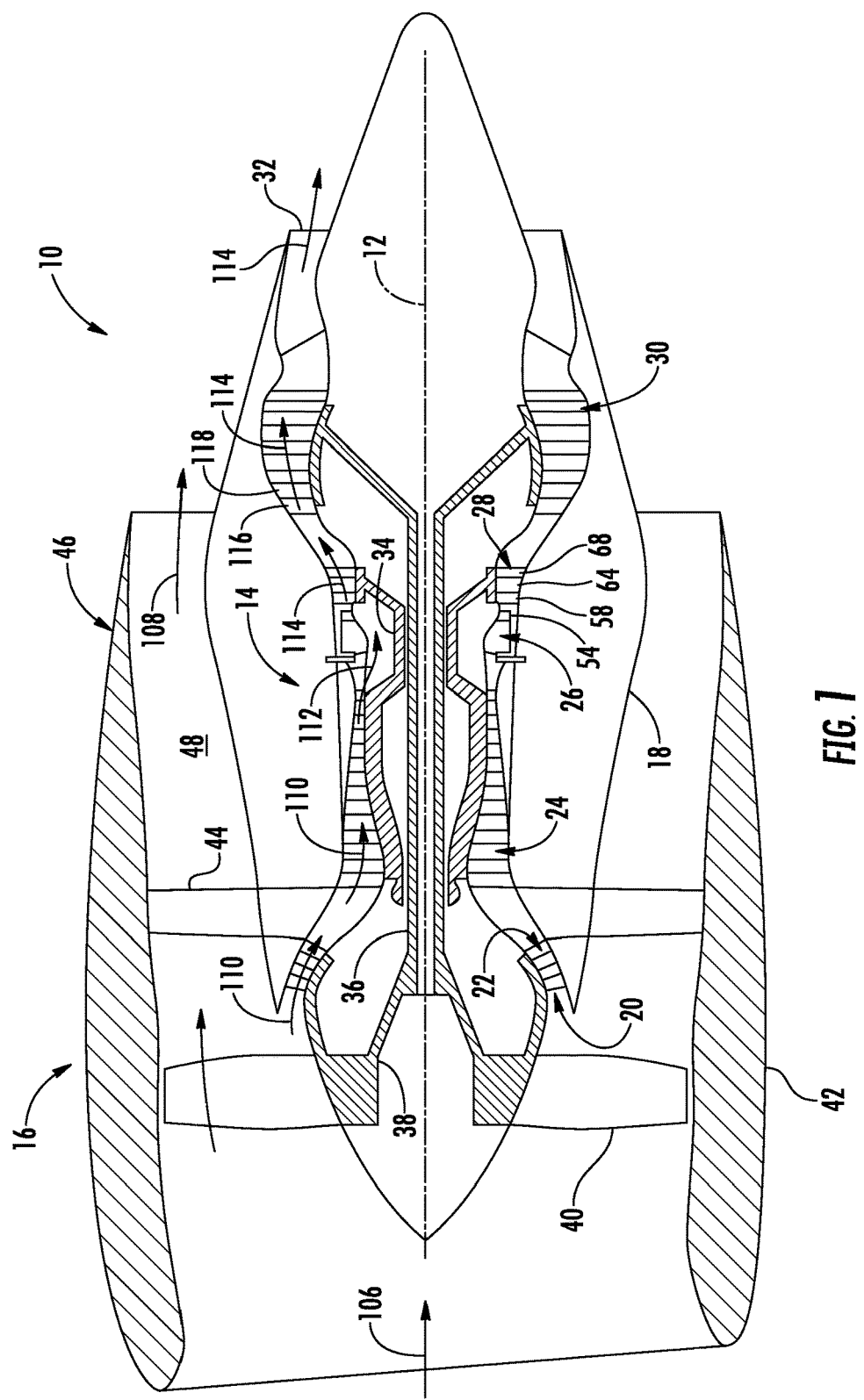
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the drawings, wherein identical numerals indicate the same elements throughout the figures, FIG. 1 is a schematic cross-sectional view of an exemplary high-bypass turbofan type engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a core turbine or gas turbine engine 14 this disposed downstream from a fan section 16.

Figure 3:
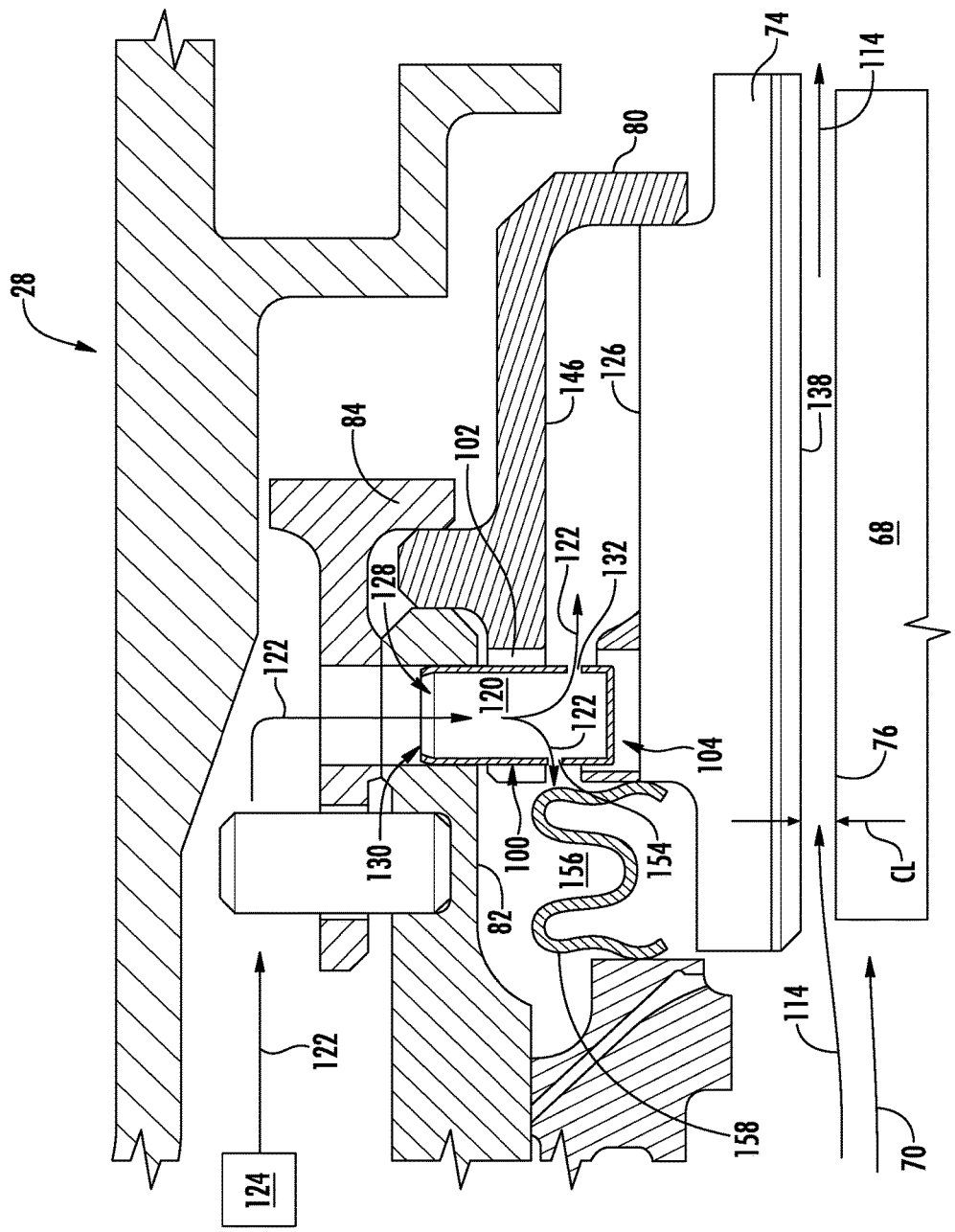
FIG. 3 is an enlarged cross sectional side view of a system for cooling a turbine shroud as incorporated into the high pressure turbine as shown in FIG. 2, according to various embodiments of the present invention.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, as shown in FIG. 3, the (LP) spool 36 may be connected directly to the fan spool 38 such as in a direct-drive configuration. In alternative configurations, the (LP) spool 36 may be connected to the fan spool 38 via a reduction gear such as in an indirect-drive or geared-drive configuration.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 so as to define a bypass airflow passage 48 therebetween.

Along with a turbofan engine 10, a core turbine 14 serves a similar purpose and sees a similar environment in land based gas turbine, a turbojet engine, where the ratio of the first portion of air 108 to the second portion of air 110 is less than that of a turbo fan, and in an unducted fan engine, where fan section 16 is devoid of a nacelle 42. In each of the turbofan, turbojet, and unducted engines, a speed reduction device, for example, a reduction gearbox, may be included between any shafts and spools, for example, between the (LP) shaft or spool 36 and the fan spool or shaft 38 of the fan section 14.

Figure 2:
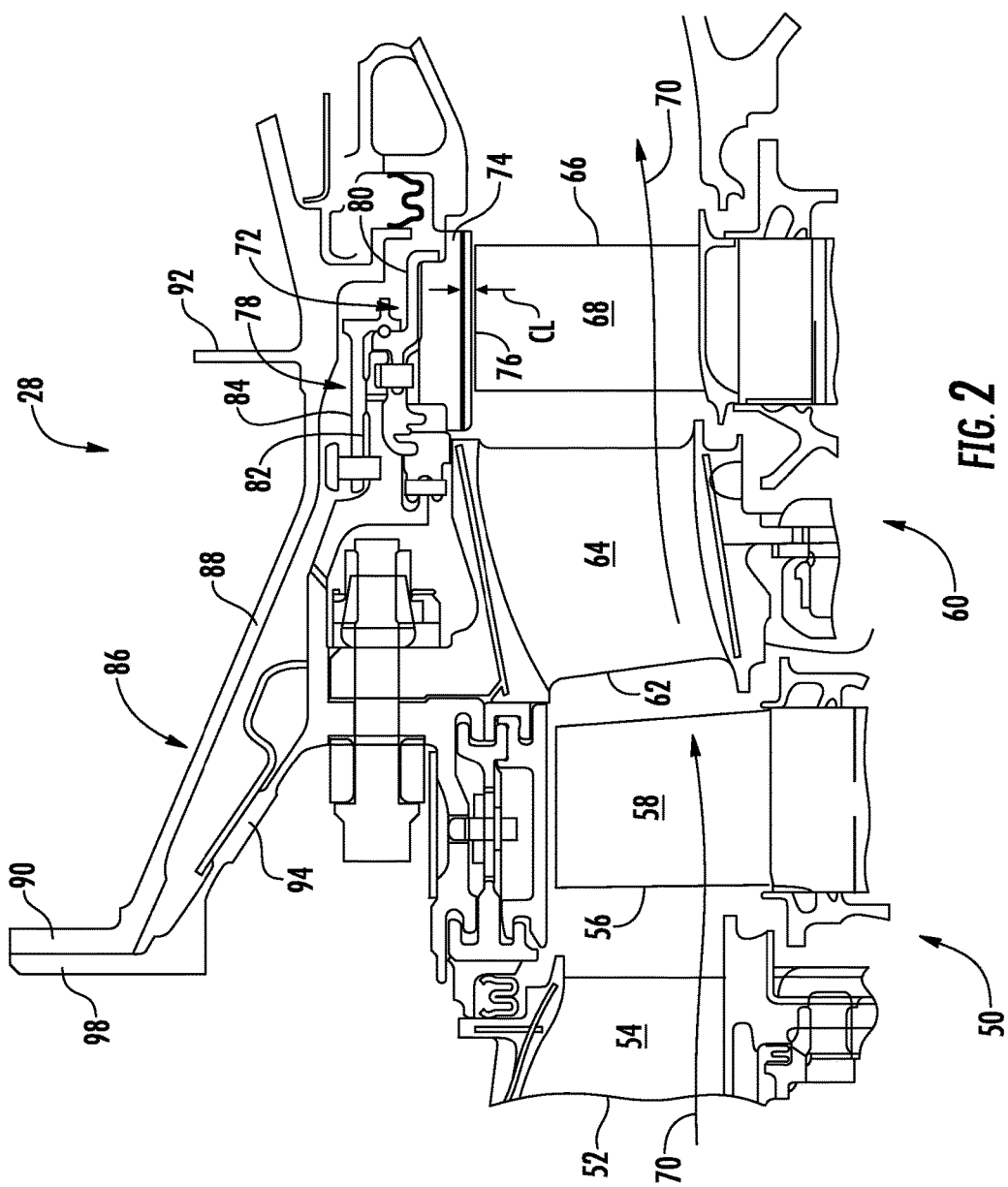
FIG. 2 is an enlarged cross sectional side view of a high pressure turbine portion of the gas turbine engine as shown in FIG. 1, as may incorporate various embodiments of the present invention.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes a row 52 of stator vanes 54 (only one shown) axially spaced from a row 56 of turbine rotor blades 58 (only one shown). The HP turbine 28 further includes a second stage 60 which includes a row 62 of stator vanes 64 (only one shown) axially spaced from a row 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

In various embodiments, as shown in FIG. 2, the HP turbine 28 includes a multi-ring turbine shroud assembly 72 that forms an annular ring around the row 66 of turbine rotor blades 68 of the second stage 60. The turbine shroud assembly 72 includes a plurality of shroud seals 74 (only one shown). The shroud seals 74 are radially spaced from a blade tip 76 of each of the turbine rotor blades 68. A radial or clearance gap CL is defined between the blade tips 76 and the shroud seals 74. The shroud seals 74 reduce leakage from the hot gas path 70 through the clearance gap CL.

It is generally desirable to minimize the clearance gap CL between the blade tips 76 and the shroud seals 74, particularly during cruise operation of the turbofan 10. Thus, in particular embodiments, the shroud seal 74 disclosed herein may be a continuous ring made of a composite material and, more particularly, a ceramic matrix composite (CMC) material and is supported by a shroud support assembly 78 including metallic and concentric inner, middle, and outer shroud support rings 80, 82, 84 connected to a static structure or backbone 86 of the gas turbine engine 14.

The backbone 86 is an engine frame that provides structural support for various static components that are positioned radially inwardly from the backbone 86. The backbone 86 also couples the outer casing 18 around the gas turbine engine 14. The backbone 86 facilitates controlling engine clearance closures defined between the outer casing 18 and components positioned radially inwardly from the backbone 86. The backbone 86 is typically designed to be rigid or stiff.

In various embodiments, as shown in FIG. 2, a HP turbine casing 88 having substantially circular and parallel upstream and downstream flanges 90, 92, is bolted to a combustor casing (not shown) of the combustion section 26 (FIG. 1). A turbine shroud support ring 94 supports the inner, middle, and outer shroud support rings 80, 82, 84. The inner, middle, and outer shroud support rings 80, 82, 84 may be single piece full 360 degree rings. The turbine shroud support ring 94 includes a turbine shroud support ring flange at a forward end 98 of the turbine shroud support ring 94. The shroud seals 74 and the inner, middle, and outer shroud support rings 80, 82, 84 are arranged annularly around or circumscribed about the centerline 12.

FIG. 3 provides an enlarged cross sectional side view of a portion of the HP turbine 28 including a portion of the HP turbine casing 88, a portion of the turbine shroud support assembly 78 including a shroud seal 74 and the inner, middle, and outer shroud support rings 80, 82, 84 and a portion of the turbine rotor blade 68. In various embodiments, as shown in FIGS. 2 and 3, a plurality of pins 100 (only one shown for clarity) such as clocking or pins extend radially inwardly from the middle ring 82 through radially extending slots 102 (FIG. 3) in the inner ring 80 and into radially extending notches 104 or pockets (FIG. 3) of the shroud seal 74. The pins 100 may be formed from any material having mechanical and/or thermal properties that are suitable for use in the turbine shroud support assembly 78 as described herein. The pins 100 contact the shroud seal 74 and/or a side wall of the notch 104 thus preventing the shroud seal 74 from shifting radially off-center with respect to centerline 12. Besides radially positioning the shroud seal 74, the pins 100 may prevent the shroud seal 74 from rotating about the centerline 12. The pins 100 may fully position the shroud seal 74 while allowing for thermal axial growth of the shroud seal 74 during operation of the gas turbine engine 14.

During operation of the turbofan 10, as illustrated at least in part in FIGS. 1, 2 and 3 collectively, air 106 enters an inlet portion of the turbofan 10. A first portion of the air 108 is directed into the bypass flow passage 48 and a second portion of the air 110 enters the inlet 20 of the LP compressor 22. The second portion of air 110 is progressively compressed as it is routed from the LP compressor 22 into the HP compressor 24. The second portion of the air 110 is further compressed as it is routed through the HP compressor 24, thus providing compressed air 112 to the combustion section 26 where it is mixed with fuel and burned to provide combustion gases 114. The combustion gases 114 are routed through the HP turbine 28 where a portion of thermal and/or kinetic energy from the combustion gases 114 is extracted via the stator vanes 54, 64 and turbine rotor blades 58, 68 of the first and second stages 50, 60 respectively, thus causing the HP shaft or spool 34 to rotate, thereby supporting operation of the HP compressor 24.

The combustion gases 114 are then routed through the LP turbine 30 where a second portion of thermal and kinetic energy is extracted from the combustion gases 114 via sequential stages of LP turbine stator vanes 116 and LP turbine rotor blades 118 that are coupled to the LP shaft or spool 36, thus causing the LP shaft or spool 36 to rotate, thereby supporting operation of the LP compressor 22 and/or rotation of the fan spool or shaft 38. The combustion gases 114 are then routed through the jet exhaust nozzle section 32 of the gas turbine engine 14.

The temperature of the combustion gases 114 flowing through the HP and LP turbine sections 28, 30, particularly through the HP turbine 28, may be extreme. For example, the combustion gases 114 flowing through a portion of the hot gas path 70 defined by/within the HP turbine 28 may exceed 2000 degrees Fahrenheit. As a result, it is necessary and/or beneficial to cool the various turbine hardware components of the HP turbine 28 and/or the LP turbine 30 such as but not limited to the turbine shroud seals 74 to meet thermal and/or mechanical performance requirements.

In various embodiments, as shown in FIG. 3, at least one pin 100 includes and/or defines a flow passage 120 for providing a flow of a cooling medium (as indicated by arrow 122) from a cooling medium source 124, such as but not limited to the HP compressor 24 and/or the LP compressor 22, onto a back or cool side surface 126 of the shroud seal 74. In particular embodiments, the flow passage 120 of the pin 100 includes an inlet 128 defined or formed at an upstream end 130 of the pin 100. The inlet 128 provides for fluid communication from the cooling medium source 124 into the flow passage 120.

Figure 4:
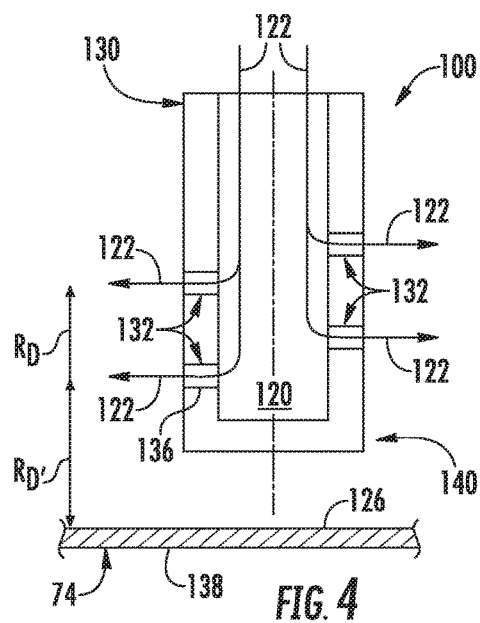
FIG. 4 is a cross sectional side view of an exemplary pin of the system for cooling a turbine shroud according to various embodiments of the present invention.
Figure 5:
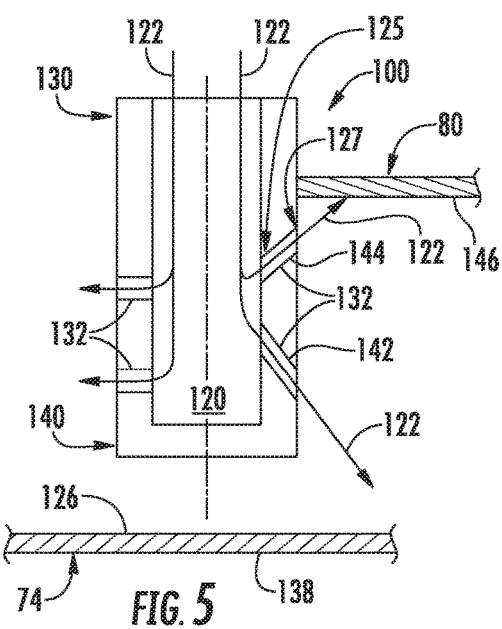
FIG. 5 is a cross sectional side view of an exemplary pin of the system for cooling a turbine shroud according to various embodiments of the present invention.
Figure 6:
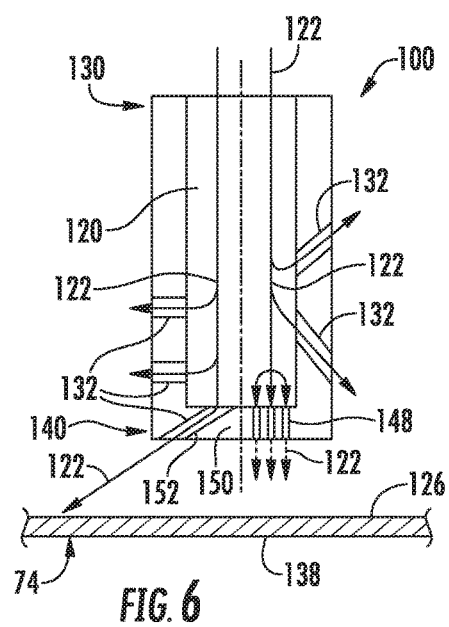
FIG. 6 is a cross sectional side view of an exemplary pin of the system for cooling a turbine shroud according to various embodiments of the present invention.

FIGS. 4, 5 and 6 provide cross sectional side views of exemplary pins 100 according to various embodiments of the present invention. In particular embodiments, as shown in FIGS. 3, 4, 5 and 6, pin 100 includes and/or defines an aperture 132 that provides for fluid communication out the flow passage 120. In particular embodiments, the pin 100 includes a plurality of apertures 132 that provide for fluid communication out the flow passage 120. In various embodiments, at least one of the aperture(s) 132 is/are oriented so as to direct at least a portion of the cooling medium 122 out of the flow passage 120 at an angle or in a flow direction that is non-perpendicular with respect to the back side surface 126 of the shroud seal 74.

In particular embodiments, as shown in FIG. 4, at least one aperture 136 of the plurality of apertures 132 is oriented so as to direct at least a portion of the cooling medium 122 substantially parallel with respect to the to the back side surface 126 of the shroud seal 74, thus providing convection cooling thereto, rather than impingement or jetted cooling thereto. As a result, thermal stresses typically caused by a large through thickness thermal gradient may be reduced. The through thickness thermal gradient may generally occur due to large temperature differentials between the cooling medium 122 and/or the back side surface 126, and a radially inner side or hot side surface 138 of the shroud seal 74 which is radially spaced from the back side surface and that is directly exposed to the combustion gases 114.

In one embodiment, as shown in FIG. 4, the plurality of apertures 132 are positioned or formed between the upstream end portion 130 of the pin 100 and a downstream end portion 140 of the pin 100 and are radially offset from each other at various radial distances $R_D$ from the back side surface 126, thereby radially distributing the flow of the cooling medium 122 from the flow passage 120. In this manner, a portion of the cooling medium 122 may be used to cool other portions of the shroud seal 74 and/or other shroud support assembly 78 components such as but not limited to the inner, middle, and outer shroud support rings 80, 82, 84 (FIG. 3).

In various embodiments, as shown in FIG. 5, at least one aperture 142 of the plurality of apertures 132 is disposed or formed between the upstream and downstream portions 130, 140 of the pin 100. Aperture 142 is oriented with respect to the back side surface 126 of the shroud seal 74 such that at least a portion of the flow of the cooling medium 122 is directed towards the back side surface 126 in a flow direction or orientation that is non-perpendicular and non-parallel to the back side surface 126.

In one embodiment, as shown in FIG. 5, at least one aperture 144 of the plurality of apertures 132 is disposed or formed between the upstream and downstream portions 130, 140 of the pin 100 and is oriented with respect to an inner surface 146 of the inner shroud support ring 80 such that at least a portion of the flow of the cooling medium 122 is directed radially upwardly and away from the back side surface 126 in a flow direction or orientation that is non-parallel to the back side surface 126. In this manner, at least a portion of the cooling medium 122 may be used to cool at least a portion of the inner shroud support ring 80. More particularly, as shown in FIG. 5, the aperture 144 extends between an interior end 125 and an exterior end 127. The cooling medium 122 enters the aperture 144 through interior end 125 and exits the aperture 144 through the exterior end 127. Notably, the exterior end 127 of the aperture 144 is offset radially outward from the interior end 125 of the aperture 144 such that at least a portion of the flow of the cooling medium 122 is directed radially outwardly and away from the back side surface 126 of the shroud seal 74. Thus, as noted above, at least a portion of the cooling medium 122 may be used to cool at least a portion of the inner shroud support ring 80.

In particular embodiments, as shown in FIG. 6, the pin 100 may include a plurality of metering apertures 148 in addition or in the alternative to the plurality of apertures 132. In particular embodiments, at least one of the metering apertures 148 may be defined or formed within a downstream wall 150 of the pin 100. The metering apertures 148 may be directed towards the back side surface 126 of the shroud seal 74, however, the metering apertures 148 are sized and/or shaped so as to diffuse or decrease flow velocity of the cooling medium 122 flowing therefrom as compared to the flow velocity of the cooling medium 122 entering the inlet 128 of the flow passage 120, thereby providing cooling to the back side surface 126 while preventing jetted or impingement cooling of the back side surface 126 by the cooling medium 122. It should be appreciated that any or all of the apertures 132 of the plurality of apertures 132 may be sized and/or shaped so as to diffuse or decrease flow velocity of the cooling medium 122 flowing therefrom as compared to the flow velocity of the cooling medium entering the inlet 128 of the flow passage 120 so as to control cooling rate and/or effectiveness at particular locations along the pin 100.

In particular embodiments, as shown in FIG. 6, at least one aperture 152 of the plurality of apertures 132 is defined or formed by or within the downstream wall 150. The aperture 152 is oriented with respect to the back side surface 126 of the shroud seal 74 such that at least a portion the flow of the cooling medium 122 is directed towards the back side surface 126 in a flow direction or orientation that is non-perpendicular and non-parallel to the back side surface 126, thereby preventing and/or reducing jetted or impingement cooling of the back side surface 126 by the cooling medium 122. Referring back to FIG. 3, in one embodiment, at least one aperture 154 is oriented to direct a at least a portion of the cooling medium 122 into a passage or plenum 156 to provide cooling to a portion of the middle shroud support ring 82 and/or a seal 158.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for cooling a turbine shroud of a turbine engine defining an axial direction, an axial centerline extending along the axial direction, and a radial direction, the system comprising:
    a cooling medium source that provides a cooling medium;
    a turbine shroud support assembly including a shroud support ring;
    a shroud seal coupled to the turbine shroud support assembly, the shroud seal having a back side surface spaced from an inner side surface along the radial direction and a notch defined along the back side surface; and
    a pin that extends at least partially through the shroud support ring and into the notch of the shroud seal but is spaced from the notch such that the pin positions the shroud seal while allowing for thermal growth of the shroud seal, the pin having a flow passage including an inlet that is in fluid communication with the cooling medium source and an aperture that is disposed downstream from the inlet;
    wherein the aperture extends between an interior end and an exterior end through which the cooling medium exits the aperture, and wherein the exterior end of the aperture is offset outward from the interior end of the aperture along the radial direction with respect to the axial centerline such that at least a portion of the flow of the cooling medium is directed outward along the radial direction with respect to the axial centerline and away from the back side surface of the shroud seal.

2. The system as in claim 1, wherein the cooling medium source comprises at least one of a low pressure compressor and a high pressure compressor.

3. The system as in claim 1, wherein the back side surface of the shroud seal is oriented towards an inner surface of the shroud support ring.

4. The system as in claim 1, wherein the pin includes a downstream wall.

5. The system as in claim 1, wherein the aperture is oriented to direct at least a portion of the cooling medium towards an inner surface of the shroud support ring.

6. The system as in claim 1, further comprising a metering hole that extends through a downstream wall portion of the pin, wherein the metering hole is in fluid communication with the flow passage.

7. The system as in claim 1, wherein the shroud seal is formed from a ceramic matrix composite material.

8. A system for cooling a turbine shroud of a turbine engine defining an axial direction, an axial centerline extending along the axial direction, and a radial direction, the system comprising:
    a cooling medium source that provides a cooling medium;
    a shroud support ring;
    a shroud seal coupled to the shroud support ring, the shroud seal having a back side surface and an inner surface spaced from the back side surface along the radial direction; and
    a pin that extends at least partially through the shroud support ring and towards the back side surface but is spaced from the back side surface such that the pin positions the shroud seal while allowing for thermal growth of the shroud seal, the pin having a flow passage including an inlet that is in fluid communication with the cooling medium source and a plurality of apertures disposed downstream from the inlet, the plurality of apertures including a first aperture;
    wherein the first aperture extends between an interior end through which the cooling medium enters the first aperture and an exterior end through which the cooling medium exits the first aperture, and wherein the exterior end of the first aperture is offset outward from the interior end of the first aperture along the radial direction with respect to the axial centerline such that at least a portion of the flow of the cooling medium is directed outward along the radial direction with respect to the axial centerline and away from the back side surface of the shroud seal.

9. The system as in claim 8, wherein the cooling medium source comprises at least one of a low pressure compressor and a high pressure compressor.

10. The system as in claim 8, wherein the back side surface of the shroud seal is oriented towards an inner surface of the shroud support ring.

11. The system as in claim 8, further comprising a metering hole that extends through a downstream wall portion of the pin, wherein the metering hole is in fluid communication with the flow passage.

12. The system as in claim 8, wherein the plurality of apertures further comprises a second aperture.

13. The system as in claim 12, wherein at least one of the first aperture and the second aperture is oriented to direct at least a portion of the cooling medium towards an inner wall of the shroud support ring.

14. The system as in claim 13, wherein the second aperture is oriented to direct at least a portion of the cooling medium towards a seal of the turbine shroud.

15. A system for cooling a turbine shroud of a turbine engine defining an axial direction, an axial centerline extending along the axial direction, and a radial direction, the system comprising:
   a cooling medium source that provides a cooling medium;
   a turbine shroud support assembly comprising concentric inner, middle, and outer shroud support rings;
   a shroud seal coupled to the turbine shroud support assembly, the shroud seal having a back side surface radially spaced from an inner surface and a notch defined along the back side surface; and
   a pin that extends at least partially from the middle shroud support ring and through the inner shroud support ring into the notch of the shroud seal, the pin having a flow passage including an inlet that is in fluid communication with the cooling medium source and an aperture that is disposed downstream from the inlet;
   wherein the aperture is oriented in a non-perpendicular and non-parallel direction to the back side surface of the shroud seal to direct a flow of the cooling medium out of the flow passage in a flow direction that is non-perpendicular and non-parallel to the back side surface of the shroud seal, and wherein the aperture extends between an interior end through which the cooling medium enters the aperture and an exterior end through which the cooling medium exits the aperture, and wherein the exterior end of the aperture is offset outward from the interior end of the aperture along the radial direction with respect to the axial centerline;
   wherein the outer shroud support ring defines a radial slot that provides fluid communication between the cooling medium source and the inlet of the pin.

16. The system of claim 15, wherein the pin defines a second aperture, and wherein the second aperture is oriented to direct at least a portion of the cooling medium towards a seal positioned axially adjacent the turbine shroud.

\* \* \* \* \*